(12) United States Patent
Palekar et al.

(10) Patent No.: US 12,008,583 B2
(45) Date of Patent: Jun. 11, 2024

(54) SYSTEM AND METHOD FOR IMPLEMENTING AUTONOMOUS FRAUD RISK MANAGEMENT

(71) Applicant: JPMorgan Chase Bank, N.A., New York, NY (US)

(72) Inventors: Amol Palekar, Lewis Center, OH (US); Melissa M. Dietz, Elkton, MD (US); Timothy W. Krugh, Lewis Center, OH (US); Shankar Ramachandran, Bear, DE (US); Zhenyi Liu, Columbus, OH (US); Mithila V. Agnihotri, Columbus, OH (US); Shravan Kumar Parunandula, Hyderabad (IN); Yasaswi Divakaruni, Bengaluru (IN); Navdha Bhatia, Mumbai (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 190 days.

(21) Appl. No.: 17/232,820

(22) Filed: Apr. 16, 2021

(65) Prior Publication Data
US 2021/0326904 A1    Oct. 21, 2021

Related U.S. Application Data

(60) Provisional application No. 63/010,779, filed on Apr. 16, 2020.

(51) Int. Cl.
*G06Q 40/00* (2023.01)
*G06N 5/025* (2023.01)
*G06N 20/00* (2019.01)
*G06Q 30/018* (2023.01)

(52) U.S. Cl.
CPC ........ *G06Q 30/0185* (2013.01); *G06N 5/025* (2013.01); *G06N 20/00* (2019.01)

(58) Field of Classification Search
CPC ..... G06Q 30/0185; G06N 20/00; G06N 5/025
See application file for complete search history.

(56) References Cited

U.S. PATENT DOCUMENTS

| | | | |
|---|---|---|---|
| 10,867,303 B1 * | 12/2020 | Manapat | G06Q 20/405 |
| 11,379,855 B1 * | 7/2022 | Anderson | G06N 20/00 |
| 11,403,644 B2 * | 8/2022 | Aparício | G06N 20/00 |
| 11,410,187 B2 * | 8/2022 | Hearty | G06Q 20/40145 |

(Continued)

FOREIGN PATENT DOCUMENTS

WO    WO-2009152465 A1 * 12/2009 ............... G06N 5/02

OTHER PUBLICATIONS

Non-Patent Literature to Wedge et al., "Solving the False Positive Problem in Fraud Prediction Using Automated Feature Engineering," Machine Learning and Knowledge Discovery in Databases, pp. 372-388/, Joint European Conference on Machine Learning and Knowledge Discovery in Databases 2018 (Year: 2018).*

(Continued)

*Primary Examiner* — Abhishek Vyas
*Assistant Examiner* — William B. Bunker
(74) *Attorney, Agent, or Firm* — GREENBLUM & BERNSTEIN, P.L.C.

(57) ABSTRACT

An embodiment of the present invention is directed to developing Autonomous Fraud Risk Management to identify emerging fraud trends in near real-time and mitigate risk by executing strategies to address fraud in a timely manner.

18 Claims, 17 Drawing Sheets

(56) References Cited

U.S. PATENT DOCUMENTS

| | | | | |
|---|---|---|---|---|
| 11,487,708 | B1* | 11/2022 | Dangi | G06F 16/156 |
| 2006/0202012 | A1* | 9/2006 | Grano | G06Q 20/042 |
| | | | | 705/45 |
| 2013/0282583 | A1* | 10/2013 | Siddens | G06Q 20/405 |
| | | | | 705/44 |
| 2014/0108238 | A1* | 4/2014 | Boding | G06Q 30/06 |
| | | | | 705/39 |
| 2015/0242856 | A1* | 8/2015 | Dhurandhar | G06Q 50/01 |
| | | | | 705/44 |
| 2015/0281287 | A1* | 10/2015 | Gill | H04L 63/1416 |
| | | | | 726/1 |
| 2016/0078367 | A1* | 3/2016 | Adjaoute | G06F 16/215 |
| | | | | 706/12 |
| 2019/0095801 | A1* | 3/2019 | Saillet | G06N 5/04 |
| 2019/0228419 | A1* | 7/2019 | Sampath | G06K 9/6215 |
| 2020/0242610 | A1* | 7/2020 | Liu | G06F 18/2411 |
| 2020/0320619 | A1* | 10/2020 | Motaharian | G06Q 30/0185 |
| 2021/0042757 | A1* | 2/2021 | Hearty | G06Q 20/4016 |
| 2021/0241140 | A1* | 8/2021 | Sadashiva | G06F 16/215 |
| 2021/0312286 | A1* | 10/2021 | Shaik | G06N 3/0454 |
| 2022/0319283 | A1* | 10/2022 | Misra | G07F 19/207 |

OTHER PUBLICATIONS

Bahnsen, et al., "Feature engineering strategies for credit card fraud," Expert Systems with Applications, 51 (2016) (Year: 2016).*

Dataquest, "Data Cleaning and Preparation for Machine Learning," Dataquest catalog, Jun. 19, 2019 (Year: 2019).*

Anonymous, "5 Ways to Handle Missing Values in Machine Learning Datasets," Mystery Vault, https://analyticsindiamag.com, 2018 (Year: 2018).*

Ryman-Tubb et al., "SOAR—Sparse Oracle-based Adaptive Rule Extraction: Knowledge extraction from large-scale datasets to detect credit card fraud," IEEE, 978-1-4244-8126-2/10 2010 (Year: 2010).*

Lucas et al., "Towards automated feature engineering for credit card fraud detection using multi-perspective HMM's," HAL Open Choice, hal-02278223, 2021 (Year: 2021).*

Bahnsen et al., "Feature engineering strategies for credit card fraud," Expert Systems with Applications, 51, pp. 134-142, 2016 (Year: 2016).*

* cited by examiner

Virtual Analytics Assistant

Develop Rules

Select rules by run date: 810

20200725 [x] [▽]

Filter rules to view: 812
○ All Rules    ● Recommendations

[SUBMIT]

| Node | Total cnt | Total frd cnt | Appr frd cnt | Confirmed frd cnt | Judged frd cnt | Total dollars | Total frd dollars | Appr frd from do |
|------|-----------|---------------|--------------|-------------------|----------------|---------------|-------------------|------------------|
| Filter data... | | | | | | | | |
| 11 | xxx | xx | xx | x | x | xxx,xxx | xx,xxx | xx... |
| 12 | xxx | xx | xx | | | xxx,xxx | xx,xxx | xx... |
| 13 | xxx | xx | xx | x | x | xxx,xxx | xx,xxx | xx... |

Create Variables  [ADD] [REMOVE]  814

[ addition_ex_var ]

Select Node  816  Rule

[72]  [x ▷]

[ Custom Rule 1 ]
[ Custom Rule 2 ]
[ Custom Rule 3 ]

Select Action to perform
● Modify Rules   ○ Run Tree

Email results
[ smith@bankABC.com ]

Select date range
[Jun 1, 2020]  [Jun 30, 2020]

[SUBMIT]

Query Results 820

| Rule | Total dollars | Total frd dollars | Approved frd dollars | Confirmed frd dollars | Judged frd dollars | Total cnt | Total frd cnt | Appr frd cnt | Confirmed frd cnt |
|------|---------------|-------------------|----------------------|-----------------------|--------------------|-----------|---------------|--------------|-------------------|
| Original Rule | xx | xx | xx | xx | xx | xx | xx | xx | xx |
| Custom Rule1 | xx | xx | xx | xx | xx | xx | xx | xx | xx |
| Custom Rule2 | xx | xx | xx | xx | xx | xx | xx | xx | xx |
| Custom Rule3 | xx | xx | xx | xx | xx | xx | xx | xx | xx |

Figure 8

Virtual Analytics Assistant

Adhoc Analysis

Transactional Fraud Assessment Summary 910

Transactions | Fraud | Approved Fraud | Judged Fraud

*Refreshed latest 30 days summary for QP

Select Data
- ○ Filter data  ● Full data
- [ADD FILTER] [REMOVE FILTER]

Select Variables to summarize
[x] alert ind

Select Output Variables
[x] Total cnt  [x] Total frd cnt  [x] Appr frd cnt  [x] Confirmed frd cnt  [x] Judged frd cnt

[✓] Summary

Email Results
[✓] Transaction data
smith@bankABC.com

Select Date Range
Jun 1, 2020 — Jun 30, 2020

[SUBMIT]

Explore Data 920

Search Metadata

| Field Name | Recommended | Description |
|---|---|---|
| filter data... | | |

[<<] [<] 1/11 [>] [>>]

Get Domain values

Input your variable name  [GO]

922

| Data Type | string |
|---|---|
| Distinct Count | x |
| % Nulls | 0.x% |
| Raw values | |

Query Results 930

| Alert ind | Total dollars | Total frd dollars | Approved frd dollars | Confirmed frd dollars | Judged frd dollars | Total cnt | Total frd cnt | Appr frd cnt | Confirmed frd cnt |
|---|---|---|---|---|---|---|---|---|---|
| 1 | xx | xx | xx | xx | xx | xx | xx | xx | xx |
| 0 | xx | xx | xx | xx | xx | xx | xx | xx | xx |

Figure 9

| Dashboard | Features Dashboard | Unalerted Dashboard | Unalerted Features Dashboard | Alerted Dashboard |

CCB Risk – Transactional Fraud Assessment
Features Dashboard

SELECT DECISION TREE RUN DATE     SELECT DECISION TREE
3/6/2021 ▽     20210306_rd_20210214... ▽

Features Summary 1110    Feature Name [ ]

| Feature Name | Feature Importance ≡ | Rank ▲≡ |
|---|---|---|
| | xx.xx | 1 |
| | xx.xx | 2 |
| | xx.xx | 3 |
| | xx.xx | 4 |
| | xx.xx | 5 |
| | xx.xx | 6 |
| | xx.xx | 7 |

Features Trending 1120    Average Rank [ ]

Figure 11

| Dashboard | Features Dashboard | Unalerted Dashboard | Unalerted Features Dashboard | Alerted Dashboard |

CCB Risk – Transactional Fraud Assessment
Unalerted Features Dashboard

SELECT DECISION TREE RUN DATE: 3/6/2021 ▽
SELECT DECISION TREE: 20210306_rd_20210214... ▽

Features Summary 1310

Feature Name ▭

| Feature Name | Feature Importance | Rank |
|---|---|---|
| | | 1 |
| | xx.xx | 2 |
| | xx.xx | 3 |
| | xx.xx | 4 |
| | xx.xx | 5 |
| | xx.xx | 6 |
| | xx.xx | 7 |

Features Trending 1320         Average Rank ▭

Figure 13

| Dashboard | Features Dashboard | Unalerted Dashboard | Unalerted Features Dashboard | Alerted Dashboard | Summary... |

CCB Risk – Transactional Fraud Assessment
Alerted Features Dashboard

SELECT DECISION TREE RUN DATE    SELECT DECISION TREE
3/6/2021 ▽    20210306_rd_20210214.... ▽

Features Summary 1510    Feature Name _____

| Feature Name | Feature Importance | Rank |
|---|---|---|
| | XX.XX | 25 |
| | XX.XX | 6 |
| | XX.XX | 42 |
| | XX.XX | 7 |
| | XX.XX | 23 |
| | XX.XX | 56 |
| | XX.XX | 40 |

Features Trending 1520    Average Rank _____

Figure 15

| Dashboard | Features Dashboard | Unalerted Features Dashboard | Alerted Dashboard | Alerted Features Dashboard | Summary... |

CCB Risk – Transactional Fraud Assessment
Unalerted Summary Dashboard

| Date | Rule Syntax | Total FPR | Approved Fraud Dollars | Approved Rate |
|---|---|---|---|---|
| (All) ▽ | (All) ▽ | X —◯— XX | X —◯— XX | 0.x —◯— 0.x |

Summary Metrics 1610

| Approved FPR | Approved Fraud Count | Approved Fraud Dollars | Approved Fraud Rate | Approved NPV | Confirmed Fraud Count | Confirmed Fraud Dollars | Judged Fraud Count | Judged Fraud Dollars | Total Count | Total Dollars | Total FPR | Total Fraud Count | Total Fraud Dollars | Total Fraud Rate | Total NPV |
|---|---|---|---|---|---|---|---|---|---|---|---|---|---|---|---|

Detailed Metrics 1620

| Date ⇌ Rule Syntax | Approved FPR | Approved Fraud Count | Approved Fraud Dollars | Approved Fraud Rate | Approved NPV | Confirmed Fraud Count | Confirmed Fraud Dollars | Judged Fraud Count | Judged Fraud Dollars | Total Count | Total Dollars | Total FPR | Total Fraud Count | Total Fraud Dollars | Total Fraud Rate | Total NPV |
|---|---|---|---|---|---|---|---|---|---|---|---|---|---|---|---|---|
| 3/6/2021 | | | | | | | | | | | | | | | | |
| 12/5/2020 | | | | | | | | | | | | | | | | |
| 11/28/2020 | | | | | | | | | | | | | | | | |

Figure 16

SYSTEM AND METHOD FOR IMPLEMENTING AUTONOMOUS FRAUD RISK MANAGEMENT

CROSS REFERENCE TO RELATED APPLICATIONS

The application claims priority to U.S. Provisional Application 63/010,779, filed Apr. 16, 2020, the contents of which are incorporated by reference herein in their entirety.

FIELD OF THE INVENTION

The invention relates generally to a system and method for implementing autonomous fraud risk management.

BACKGROUND OF THE INVENTION

Developing and implementing fraud risk mitigation rules is a complex process that involves several separate stages and processes. The current process involves a number of subject matter experts at various points in the process and requires extensive time and resources. To identify a new fraud trend and effectively implement strategies to combat that fraud can take 3-4 weeks, if not longer. During this time, an entity such as a financial institution is exposed to new fraud trends and risks. By the time a fraud trend is identified, the strategies that have been developed are ineffective at addressing new fraud trends which tend to change quickly and often.

These and other drawbacks exist.

SUMMARY OF THE INVENTION

According to one embodiment, the invention relates to a system that implements autonomous fraud risk management. The system comprises: an interface that receives input from one or more users; and a fraud risk management server comprising a computer processor, coupled to a memory component and the interface, the computer processor further programmed to perform the steps of: performing feature engineering on data stored in a cloud services platform to generate a set of features, wherein feature engineering comprises feature exclusion, feature generation and feature transformation; developing fraud rule recommendations by applying one or more supervised machine learning techniques to the set of features to identify a decision tree model; based on the decision tree model, identifying a set of top recommended rules using performance evaluation of the fraud rule recommendations, wherein the performance evaluation relates to a false positive rate (FPR), return on investment (ROI), and a fraud rate; interacting with a virtual analytics assistant to modify and customize the set of top recommended rules; testing each of the set of top recommended rules in silent mode; responsive to the testing, approving at least one rule of the set of top recommended rules; upgrading the at least one rule to production; and performing rule performance evaluation and monitoring.

According to another embodiment, the invention relates to a method that implements autonomous fraud risk management. The method comprises the steps of: performing, via a fraud risk management server, feature engineering on data stored in a cloud services platform to generate a set of features, wherein feature engineering comprises feature exclusion, feature generation and feature transformation; developing, via the fraud risk management server, fraud rule recommendations by applying one or more supervised machine learning techniques to the set of features to identify a decision tree model; based on the decision tree model, identifying a set of top recommended rules using performance evaluation of the fraud rule recommendations, wherein the performance evaluation relates to a false positive rate (FPR), return on investment (ROI), and a fraud rate; interacting, via a virtual analytics assistant interface, to modify and customize the set of top recommended rules; testing each of the set of top recommended rules in silent mode; responsive to the testing, approving at least one rule of the set of top recommended rules; upgrading the at least one rule to production; and performing rule performance evaluation and monitoring.

An embodiment of the present invention is directed to a specially programmed computer system comprising one or more computer processors, interactive interfaces, electronic storage devices, and networks. The computer implemented system and method described herein provide unique risk mitigation advantages to entities, users and other participants, according to various embodiments of the invention. An embodiment of the present invention is directed to implementing autonomous fraud risk management. With an embodiment of the present invention, fraud risk strategy deployment timeline may be significantly decreased which will ultimately contribute to significant fraud loss savings. In addition, optimization may be applied to make the system more agile and easy to use and integrate with partner systems and solutions.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the present invention.

FIG. 8 illustrates an exemplary virtual analytics assistant, according to an embodiment of the present invention.

FIG. 9 illustrates an exemplary virtual analytics assistant, according to an embodiment of the present invention.

FIG. 11 illustrates an exemplary metrics dashboard, according to an embodiment of the present invention.

FIG. 13 illustrates an exemplary metrics dashboard, according to an embodiment of the present invention.

FIG. 15 illustrates an exemplary metrics dashboard, according to an embodiment of the present invention.

FIG. 16 illustrates an exemplary metrics dashboard, according to an embodiment of the present invention.

DETAILED DESCRIPTION OF THE PREFERRED EMBODIMENT(S)

Figure 1:
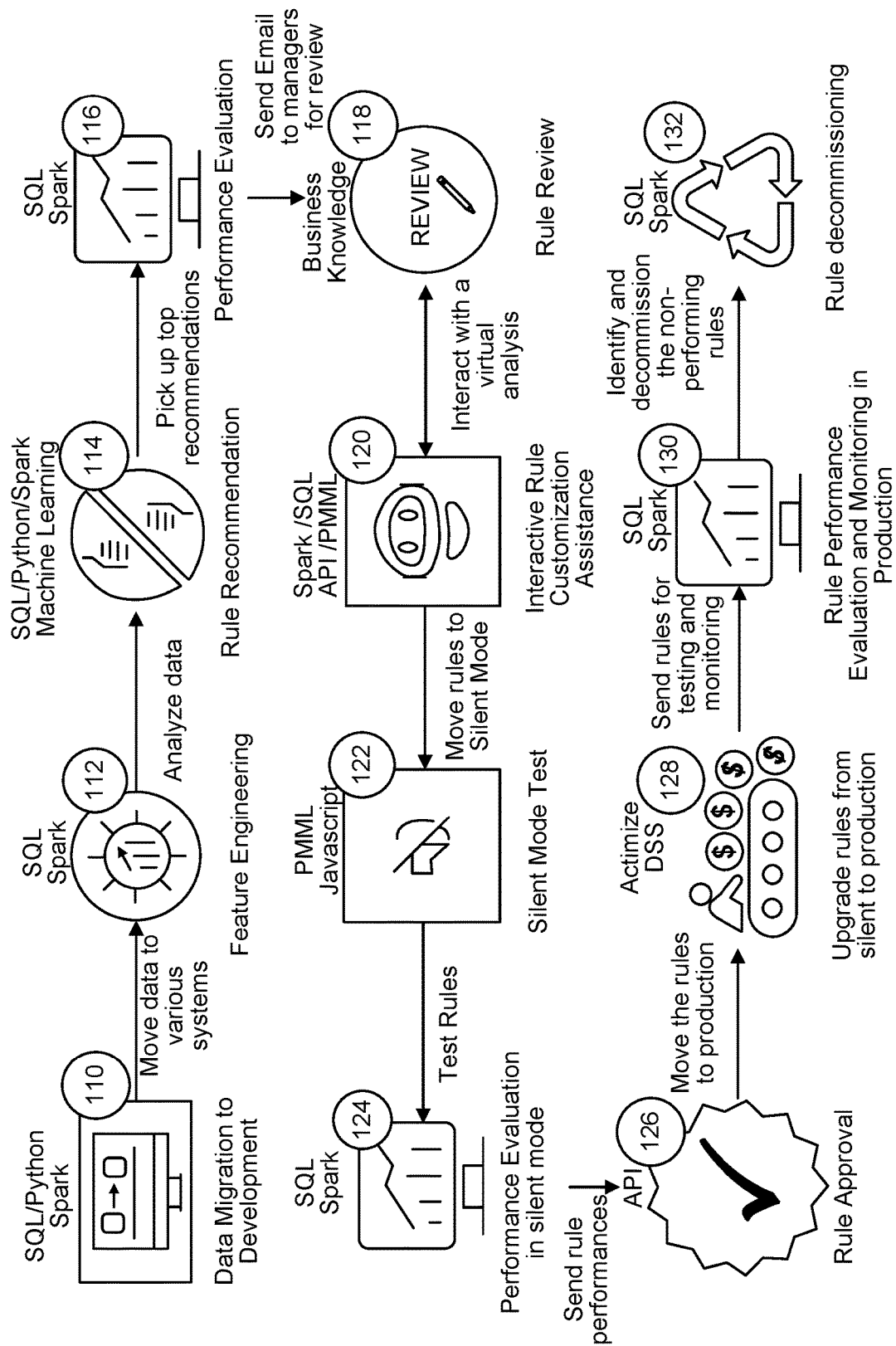
FIG. 1 is an exemplary workflow for autonomous fraud risk management, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art in light of known systems and methods, would appreciate the use of the invention for its intended purposes and benefits in any number of alternative embodiments, depending upon specific design and other needs.

An embodiment of the present invention is directed to developing Autonomous Fraud Risk Management to identify emerging fraud trends in near real-time and mitigate associated risk by deploying and executing strategies in a timely and efficient manner. An embodiment of the present invention is directed to (1) effectively and efficiently creating new rules (e.g., daily, periodically, etc.), (2) providing an automated and adaptive system and (3) implementing a globally optimal solution. For example, rules may be recommended periodically with different options to address a False Positive Rate (FPR) (e.g., number of non-fraudulent items with respect to fraudulent items), return on investment (ROI), fraud and volume. An embodiment of the present invention is directed to integrating automated recommendations and implementation. In addition, an embodiment of the present invention may be globally optimal by employing multiple algorithms and thousands of features that enable implementation of hundreds of rules in silent mode.

An embodiment of the present invention is directed to data discovery, rules development, analyst discernment, rule monitoring and rule implementation. For example, data exploration may be automated by a rule suggestion feature. Rule development automation may be performed via plain language definitions with variables; variables and virtual analyst capability and predictive model markup language (PMML) rule integration and automation of low performing rules.

An embodiment of the present invention may be directed to anomaly detection. For example, with ATM transactions, anomaly detection may observe a number of transactions in different ATM and branch locations. When a peak is detected, an embodiment of the present invention may determine whether the detected peak corresponds to a fraud event. The peak may be represented by a spike in transactions during a short window of time. The peak may also represent a high dollar amount in transactions. Other peak characteristics may be identified and detected.

Machine learning models may capture fraud events. An embodiment of the present invention may apply rule detection on top of the machine learning models. In addition, an embodiment of the present invention may be directed to updating machine learning models. As models are refreshed, corresponding rules may be automatically refreshed. This also enables more frequently updates which results in more consistent and robust results.

FIG. 1 is an exemplary workflow for autonomous fraud risk management, according to an embodiment of the present invention. At step 110, data migration may be initiated to a cloud services platform. For example, data may be migrated across various systems, including Hadoop environments. At step 112, feature engineering may be initiated to analyze data. Step 114 may involve rule recommendation where top recommendations may be identified and selected. Performance evaluation may be performed at step 116 and rules may be reviewed at step 118. For example, an electronic communication (e.g., email, etc.) may be sent to managers (or other recipients) to review. The user may interact with a virtual analyst at step 120 where the virtual analyst may provide interactive rule customization assistance. Rules may be moved to silent mode to perform a silent mode test at step 122. Rules may be tested at Performance Evaluation in silent mode at step 124. Rule performances may be sent to Rule Approval at step 126. Rules may then be moved to production at step 128 where rules may be upgraded from silent to production. At step 130, rules may be sent for testing and monitoring for Rule Performance Evaluation and Monitoring in Production. At step 132, rule decommissioning may identify and decommission non-performing rules. While the process of FIG. 1 illustrates certain steps performed in a particular order, it should be understood that the embodiments of the present invention may be practiced by adding one or more steps to the processes, omitting steps within the processes and/or altering the order in which one or more steps are performed.

Figure 2:
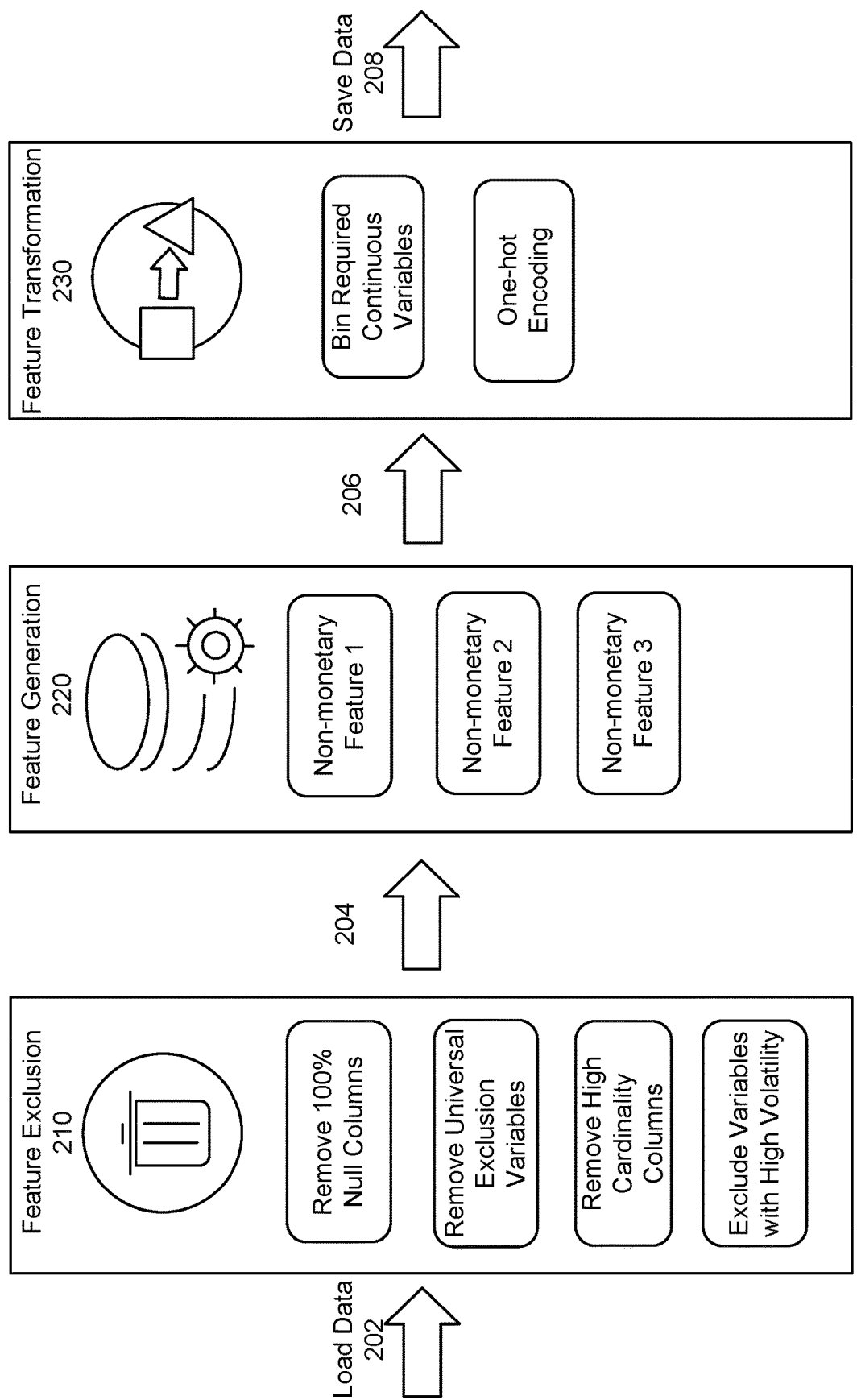
FIG. 2 is an exemplary process that illustrates feature engineering, according to an embodiment of the present invention.

FIG. 2 is an exemplary process that illustrates feature engineering, according to an embodiment of the present invention. At step 202, data may be loaded. Feature Exclusion 210 may exclude certain data. For example, exclusion may involve removing null columns, removing universal exclusion variables, removing high cardinality columns, and excluding variables with high volatility. Other exclusions may be performed. At step 204, data may be transferred to Feature Generation 220, which may include various non-monetary features. For example, non-monetary features may represent features which are not associated with payments such as feature relating to user devices. At step 206, data may be transferred to Feature Transformation 230. Feature Transformation 230 may apply bin required continuous variables and one-hot encoding. Binning generally refers to dividing a list of continuous variables into groups. One-hot encoding represents a process by which categorical variables are converted into a form that may be provided to Machine Learning (ML) algorithms for improved predictions. Data may be saved at 208.

Figure 3:
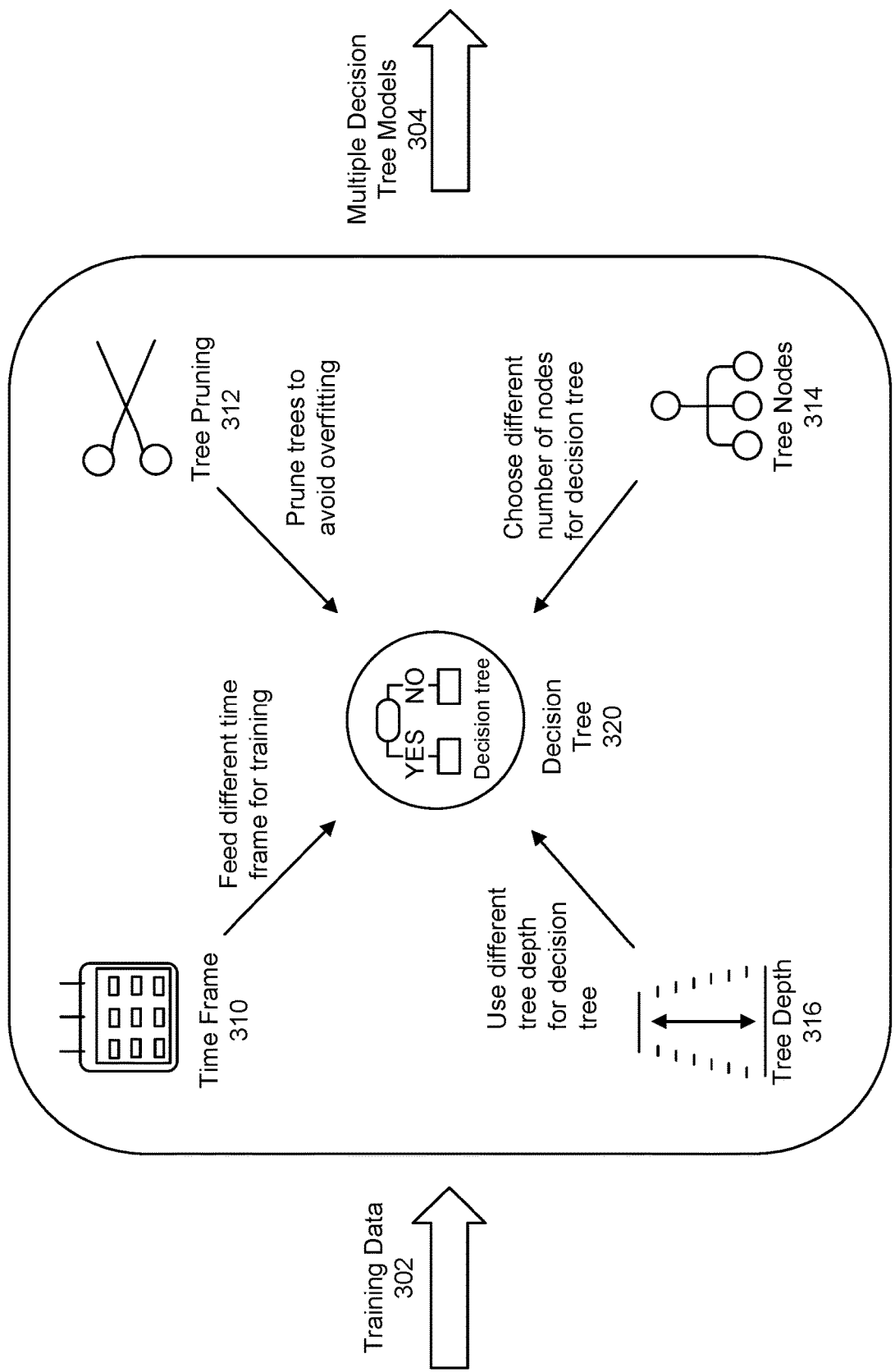
FIG. 3 is an exemplary automatic decision tree, according to an embodiment of the present invention.

FIG. 3 is an exemplary automatic decision tree, according to an embodiment of the present invention. As shown in FIG. 3, Training Data 302 may be applied to a Decision Tree. Decision Tree 320 may receive data representing Time Frame 310, Tree Pruning 312, Tree Nodes 314 and Tree Depth 316. Time Frame 310 may represent different time frames for training. Tree Pruning 312 may prune trees to avoid overfitting. Tree Nodes 314 may choose a different number of nodes for the decision tree. Tree Depth 316 may use different tree depths for the decision tree. Multiple decision tree models may be generated, as represented by 304.

Figure 4:
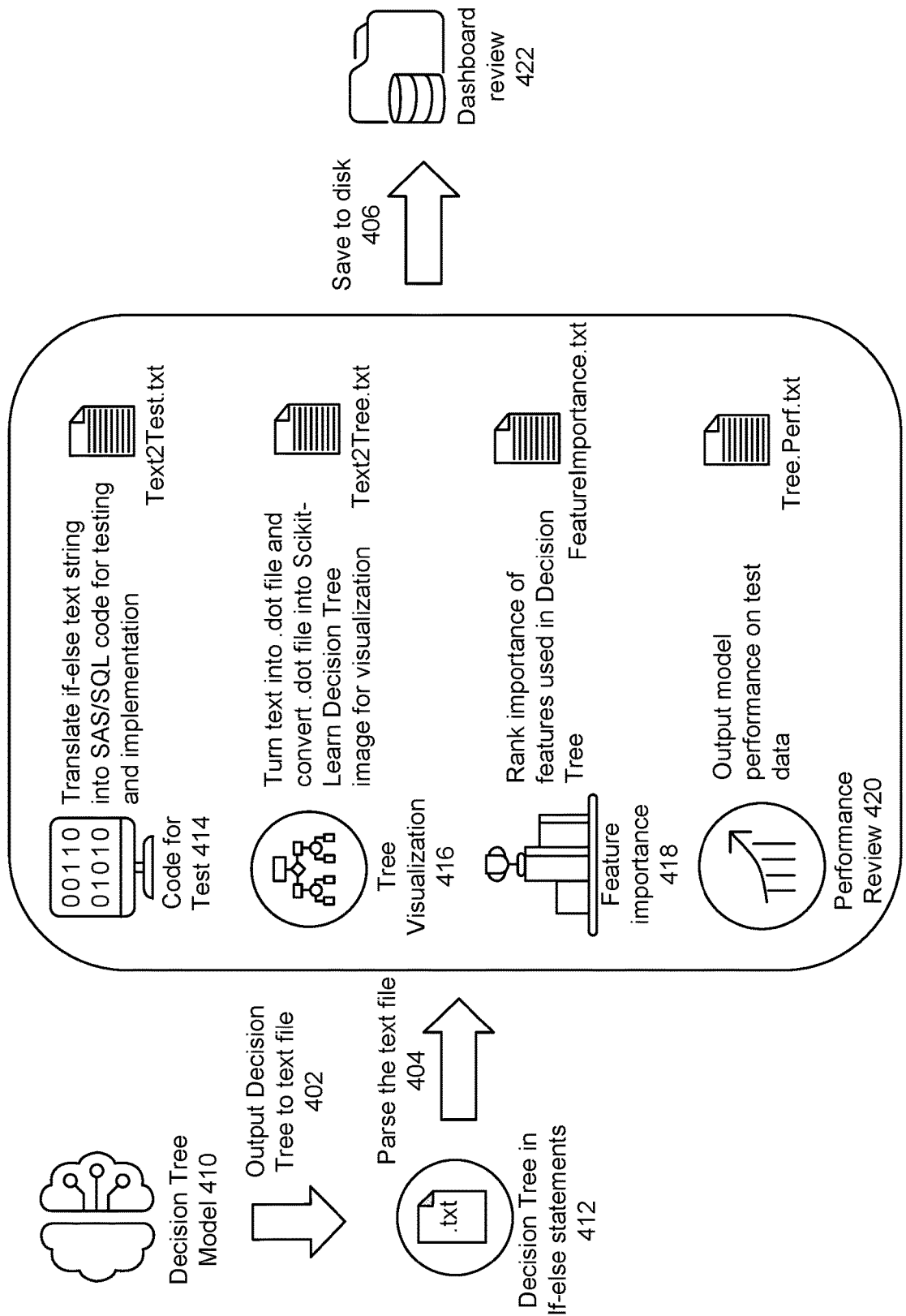
FIG. 4 is an exemplary illustration of automatic decision tree model visualization and testing, according to an embodiment of the present invention.

FIG. 4 is an exemplary illustration of automatic decision tree model visualization and testing, according to an embodiment of the present invention. Decision Tree Model 410 may be outputted as a test file, as shown by 402. Decision Tree may be represented in "if-else" statements at 412. The text file may then be parsed at 404. Parsing the text file may apply various functions including Code for Test 414, Tree Visualization 416, Feature Importance 418 and Performance Review 420. Code for Test 414 may translate if-else test strings into code (e.g., SAS/SQL code, etc.) for testing and implementation. Tree Visualization 416 may turn text into a .dot file and convert the .dot file into a decision tree image for visualization. Feature Importance 418 may rank importance of features used in a Decision Tree. Performance Review 420 may output model performance on test data. The data may be saved to a disk at 406 and presented as a Dashboard Review 422.

Figure 5:
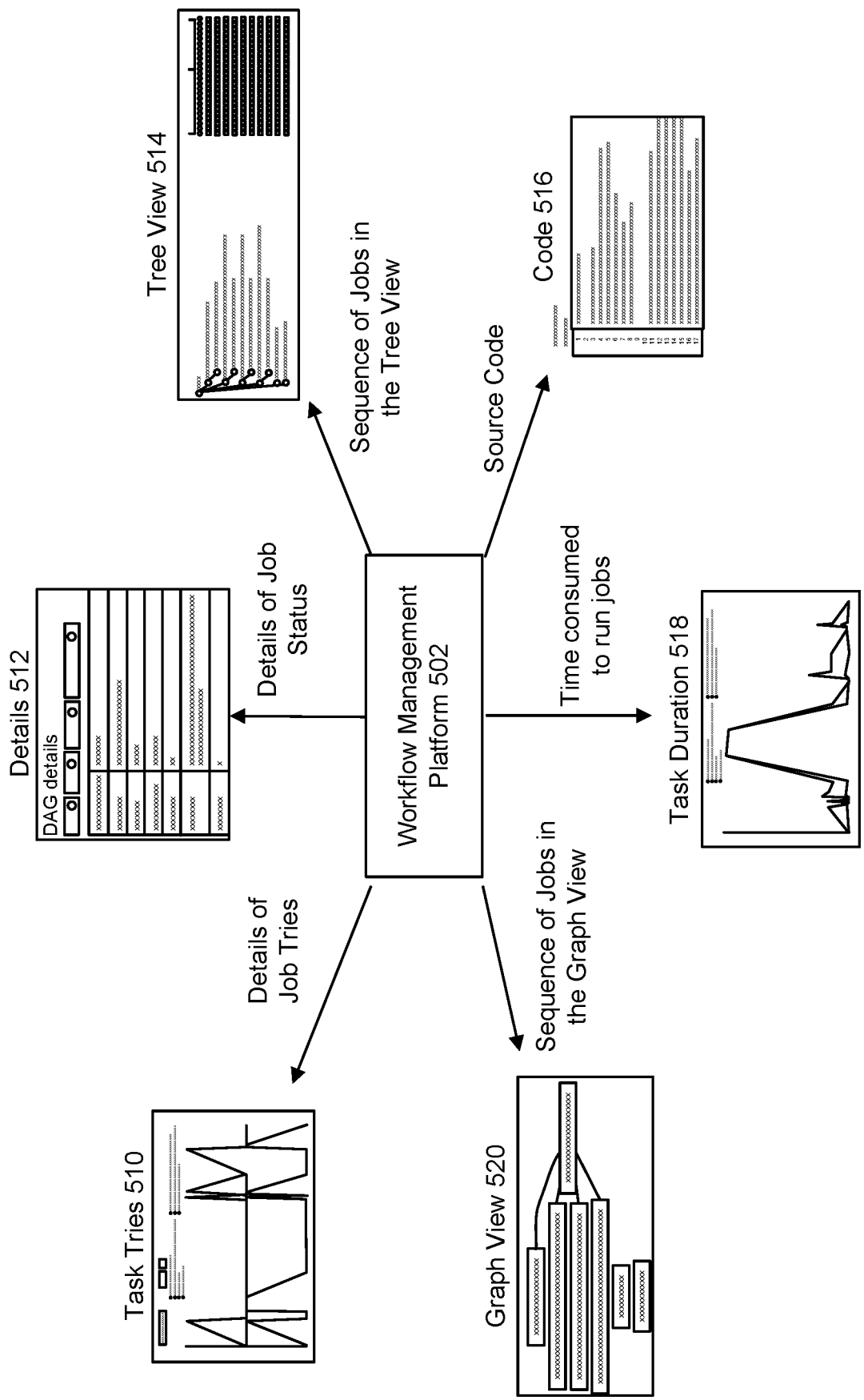
FIG. 5 is an exemplary illustration of schedule and monitor tasks, according to an embodiment of the present invention.

FIG. 5 is an exemplary illustration of schedule and monitor tasks, according to an embodiment of the present invention. Workflow Management Platform 502 provides management services of an entity's complex workflows. As shown in FIG. 5, Workflow Management Platform 502 provides details of job tries, as shown by Task Tries 510; details of job status as shown by Details 512; sequence of jobs in Tree View 514; source code 516; time consumed to run jobs at Task Duration 518; and sequence of jobs in Graph View 520. Other views and details may be provided.

Figure 6:
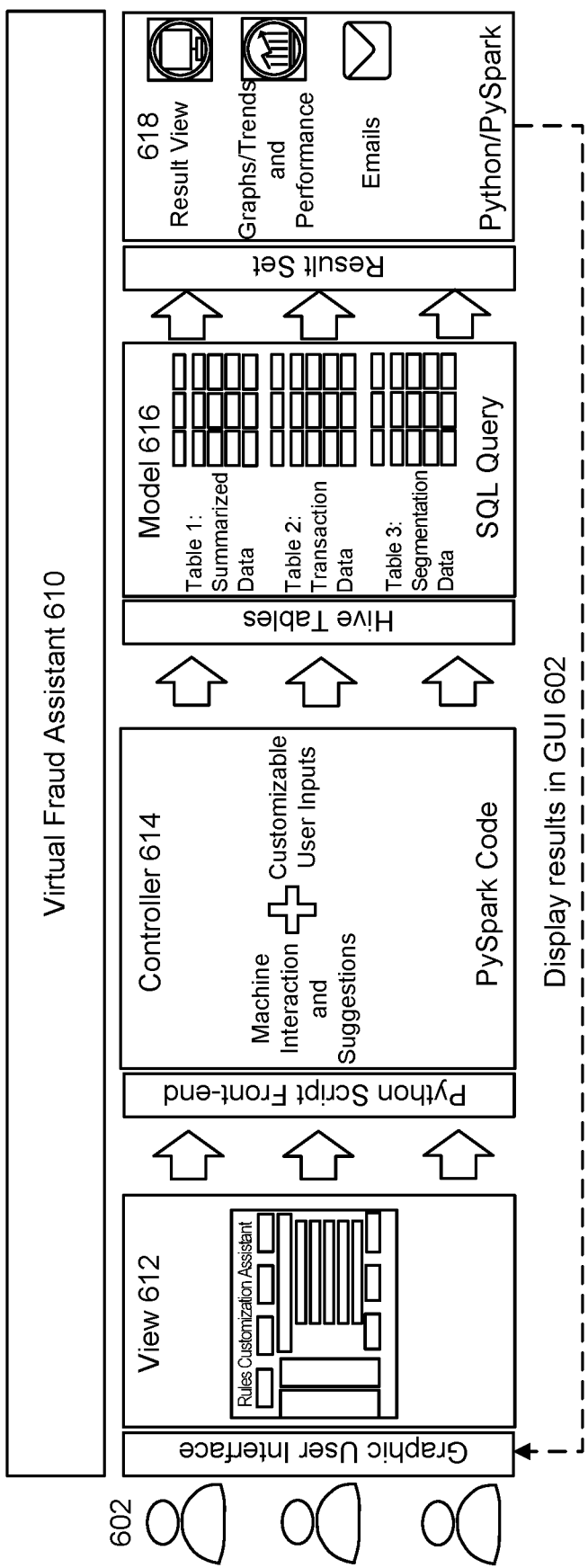
FIG. 6 is an exemplary virtual fraud analyst assistant architecture, according to an embodiment of the present invention.

FIG. 6 is an exemplary virtual fraud analyst assistant architecture, according to an embodiment of the present invention. Users 602 may interact with Virtual Fraud Assistant 610, which may include Views 612, Controller 614, Model 616 and Result Set 618. Results may be displayed via a graphical user interface 602. Controller 614 may include machine interaction and suggestions with customizable user inputs. Model 616 may include tables of summarized data, transaction data and segmentation data. Other data tables may be implemented. Result Set 618 may include Result View, Graphs/Trends and Performance and electronic communications (e.g., emails).

Figure 7A:
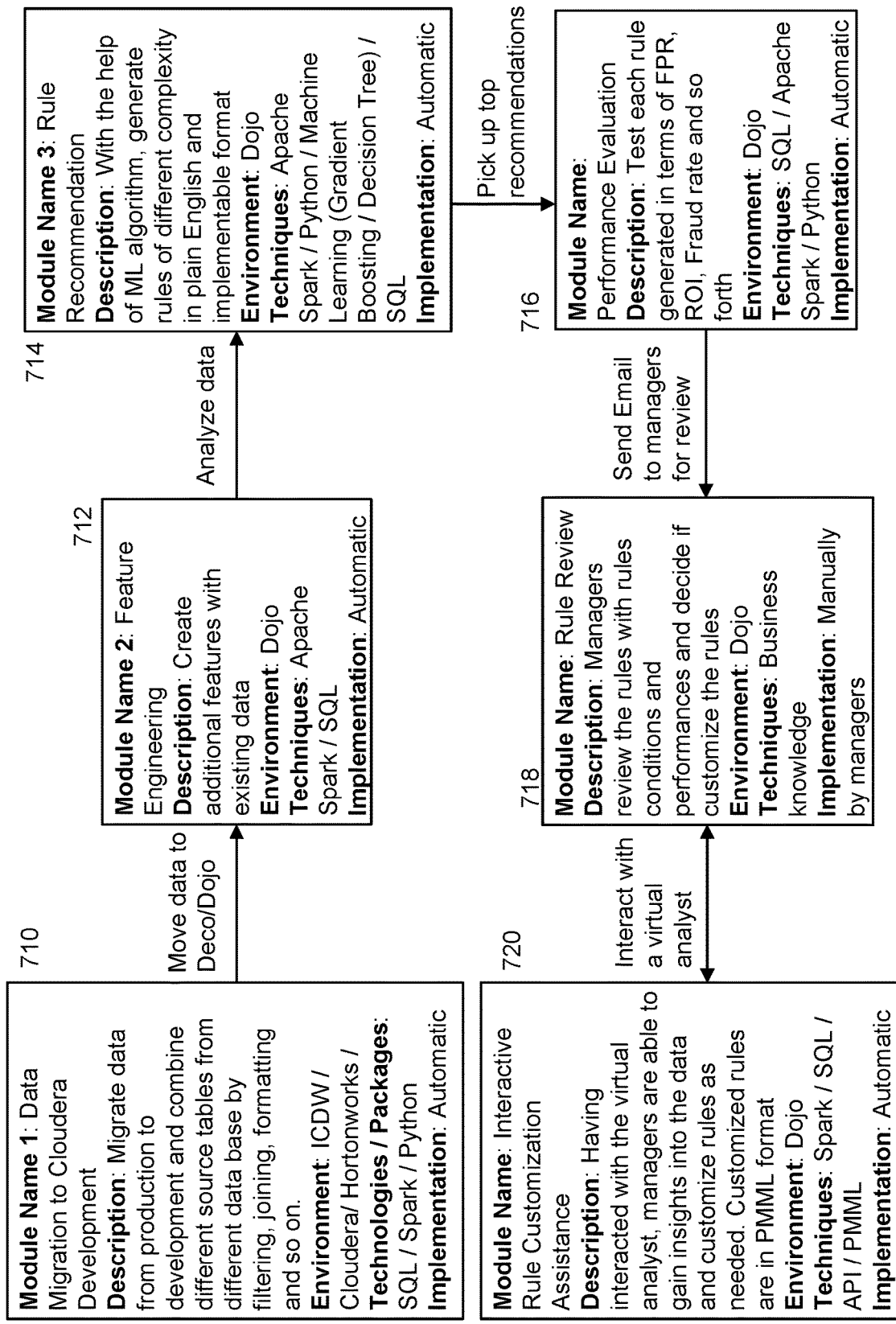
FIGS. 7A and 7B are an exemplary detailed flow diagram, according to an embodiment of the present invention.
Figure 7B:
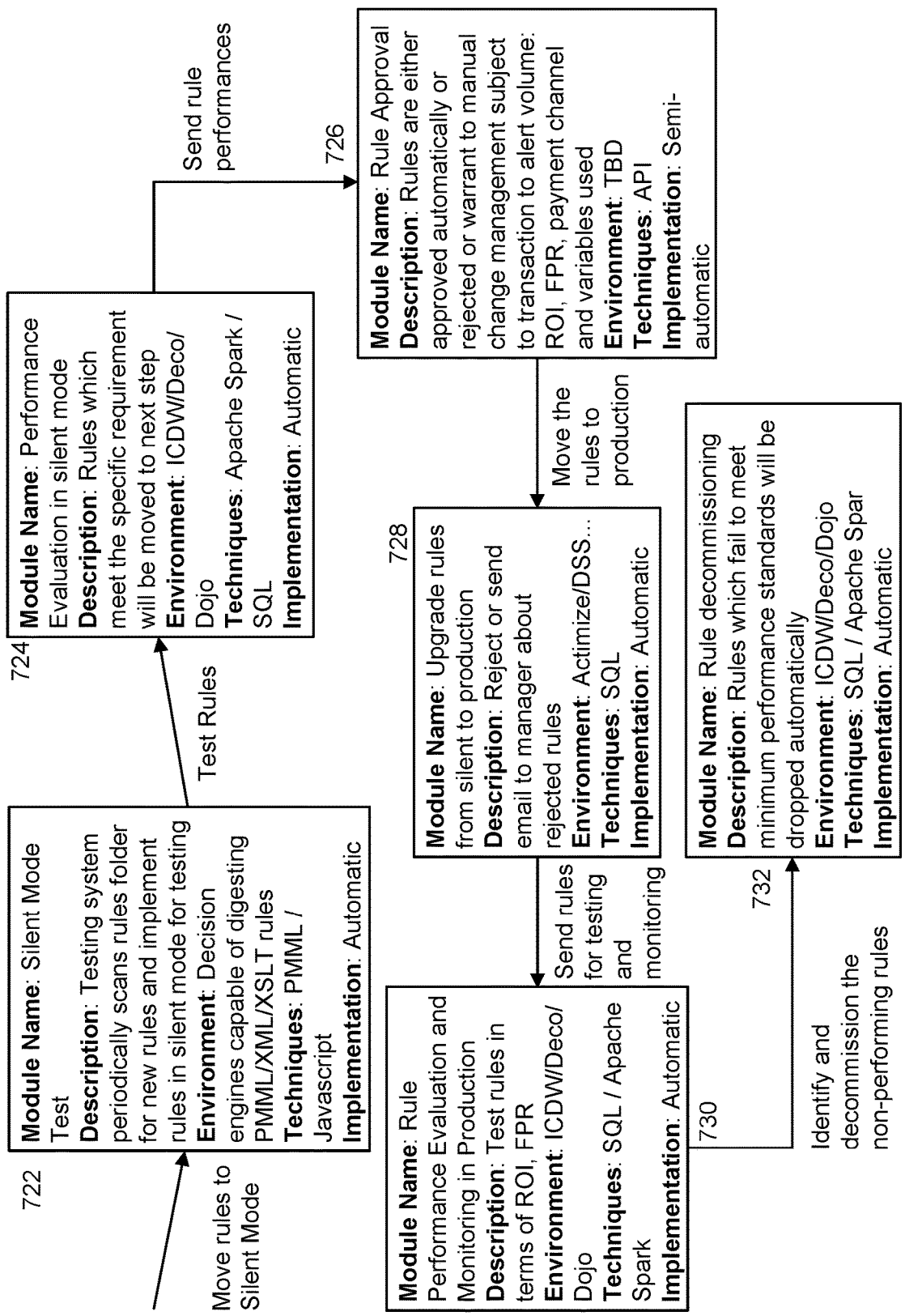

FIGS. 7A and 7B are an exemplary detailed flow diagram, according to an embodiment of the present invention. Step 710 represents data migration to a cloud services platform. This may involve migrating data from production to development and then combining different source tables from different data bases by filtering, joining, formatting, etc. Step 712 represents feature engineering. This may involve creating additional features with existing data. Step 714 represents rule recommendations. With ML algorithms, this may involve generating rules of different complexities in an understandable and implementable format. Step 716 represents performance evaluation. This may involve testing each rule generated in terms of FPR, ROI, fraud rate, etc. Step 718 represents rule review. For example, managers may review the rules with rules conditions and performances and then decide whether to customize the rules. Step 720 represents interactive rule customization assistance. This may involve interacting with a virtual analyst, which enables managers to access insights into the data and customize rules as needed.

Step 722 represents silent mode test. For example, a testing system may periodically scan rules folders for new rules and implement rules in silent mode for testing. Step 724 represent performance evaluation in silent mode. Rules that meet specific requirements may be moved to the next step. Step 726 represents rule approval. Rules may be approved automatically, rejected or may warrant manual change management subject to various conditions, such as transaction to alert volume: ROI, FPR, payment channel and variables used. For example, when a payment is deemed suspicious, payment may be declined without human intervention or reviewed by an Operations Analyst. In addition, the customer may be instructed to resolve through a self-service option such as using One Time Passcode—OTP.

Step 728 represents upgrading rules from silent to production. The system may reject or send a communication to a manager or other recipient regarding rejected rules. Rules may be sent for testing and monitoring. Step 730 represents rule performance evaluation and monitoring in production. Step 732 represents rule decommissioning. Rules which fail to meet minimum performance standards may be dropped automatically. FIGS. 7A and 7B show one exemplary application for illustration purposes. Other variations may be applied in accordance with the various embodiments of the present invention.

An embodiment of the present invention is directed to feature reduction. After initial data is pulled for a product, an embodiment of the present invention may pull other events that occurred in connection with the product. For example, the product may refer to person-to-person money transfer service and the other events may include a login that initiates the person-to-person money transfer service, e.g., Transactional Fraud Assessment. This generates a large feature space—2000 features for each event and there are ~75 such events. Accordingly, feature space reduction may be performed where all these features are fed to a random forest algorithm which generates a list of top features. This set of features are then used to train the decision tree which generates the rules to be recommended to a strategy team, for example.

FIG. 8 illustrates an exemplary virtual analytics assistant, according to an embodiment of the present invention. A user may develop rules through the virtual analytics assistant. An embodiment of the present invention may enable a user to view rules recommended during different runs and corresponding performance data. The user may also modify those rules and access new performance data, including the ability to communicate results via email, for example. As shown in FIG. 8, Rules may be selected by run date at 810. Rules may be filtered by recommendations at 812. Details may include Node, Total Count, Total Fraud count, Approved Fraud count, Confirmed Fraud count, Judged Fraud count, Total dollars, Total Fraud dollars. Variables may be created at 814. Rules may be applied at 816. Details may include selecting a node, selecting an action to perform (e.g., modify rules, run tree, etc.), identifying a recipient and selecting a date range. Custom rules may be identified. Query Results are provided at 820 and may include Rule, Total Dollars, Total Fraud Dollars, Approved Fraud Dollars, Confirmed Fraud Dollars, Judged Fraud Dollars, Total Count, Total Fraud Count, Approved Fraud Count, Confirmed Fraud Count and Judged Fraud Count.

FIG. 9 illustrates an exemplary virtual analytics assistant, according to an embodiment of the present invention. A user may perform ad hoc analysis through the virtual analytics assistant. An embodiment of the present invention may provide a summary of current fraud on a specific product/service (e.g., Transactional Fraud Assessment, etc.); an ability to check metadata for data availability for transactions and an ability to explore individual features and their distribution with respect to fraud.

As shown in FIG. 9, a Summary may be provided at 910. In this example, the summary may relate to a product or service, such as a Transactional Fraud Assessment. Summary may include data relating to Transactions, Fraud, Approved Fraud and Judged Fraud. With an embodiment of the present invention, a user may select data (e.g., filter data, full data, etc.), select variables to summarize, select output variables, identify a recipient for data (e.g., transaction data, summary, etc.), and select a date range or other filter. The virtual analyst may also enable a user to explore data at 920.

This may include search metadata (e.g., field name, recommended, description, etc.) and get domain values. Additional details may be provided at 922. Query results are provided at 930 and may include Alert Indicator, Total Dollars, Total Fraud Dollars, Approved Fraud Dollars, Confirmed Fraud Dollars, Judged Fraud Dollars, Total Count, Total Fraud Count, Approved Fraud Count, Confirmed Fraud Count and Judged Fraud Count.

Figure 10:
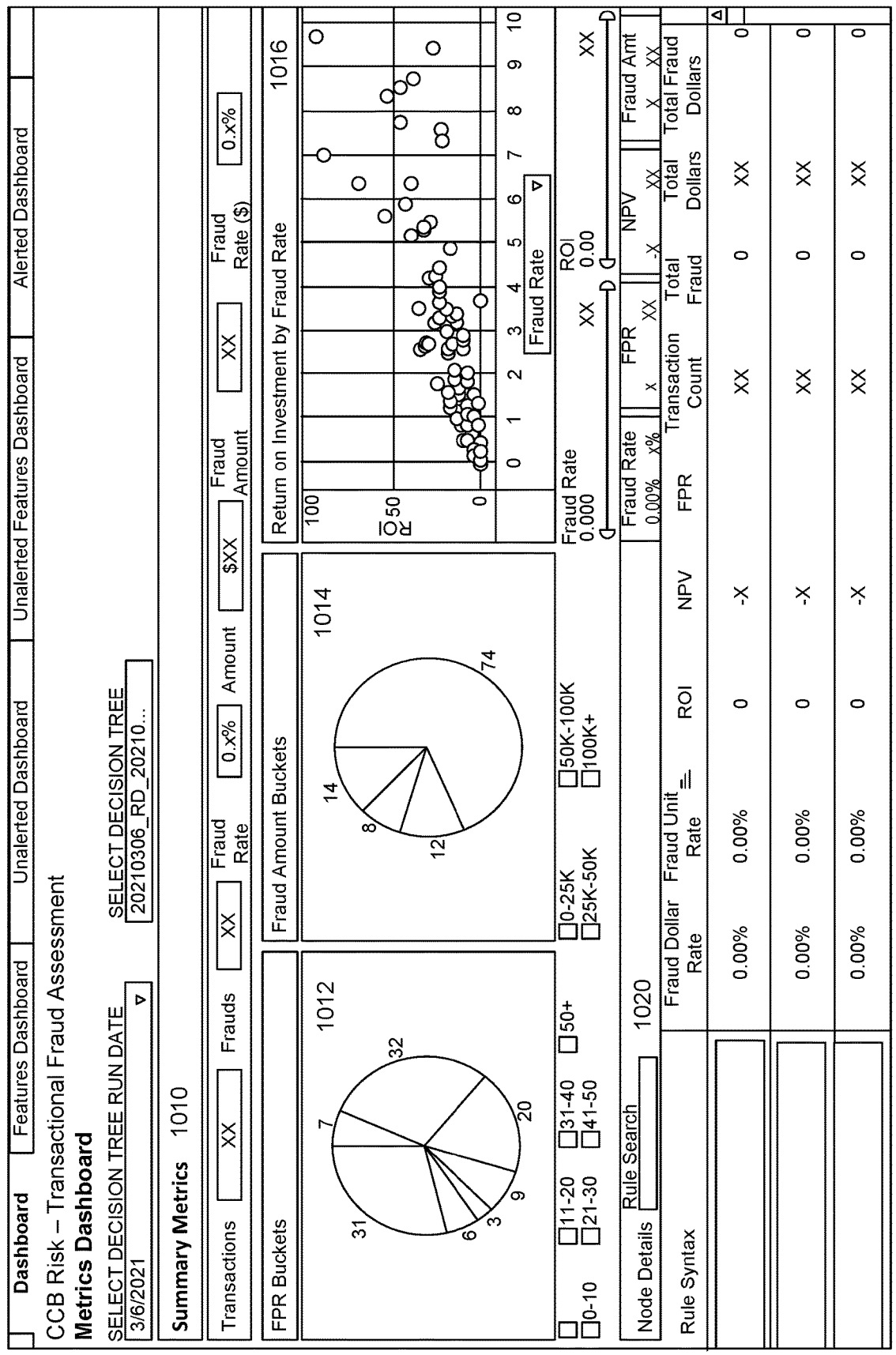
FIG. 10 illustrates an exemplary metrics dashboard, according to an embodiment of the present invention.

FIG. 10 illustrates an exemplary metrics dashboard, according to an embodiment of the present invention. Filters may be applied, such as Decision Tree Run Date and Decision Tree. Metrics dashboard may include Summary Metrics at 1010, including Transactions, Frauds, Fraud Rate, Amount, Fraud Amount, Fraud Rate ($), etc. Additional details may be provided via graphics including False Positive Rate (FPR) Buckets 1012, Fraud Amount Buckets 1014, and Return on Investment by Fraud Rate 1016. Node Details may be provided at 1020 and include Rule Syntax, Fraud Dollar Rate, Fraud Unit Rate, Return on Investment (ROI), Net Present Value (NPV), FPR, Transaction Count, Total Fraud, Total Dollars, Total Fraud Dollars, etc.

FIG. 11 illustrates an exemplary metrics dashboard, according to an embodiment of the present invention. FIG. 11 illustrates a features dashboard. Filters may be applied, such as Decision Tree Run Date and Decision Tree. Features Summary 1110 may include Feature Name, Feature Importance, and Rank. Features Trending may be graphically provided at 1120.

Figure 12:
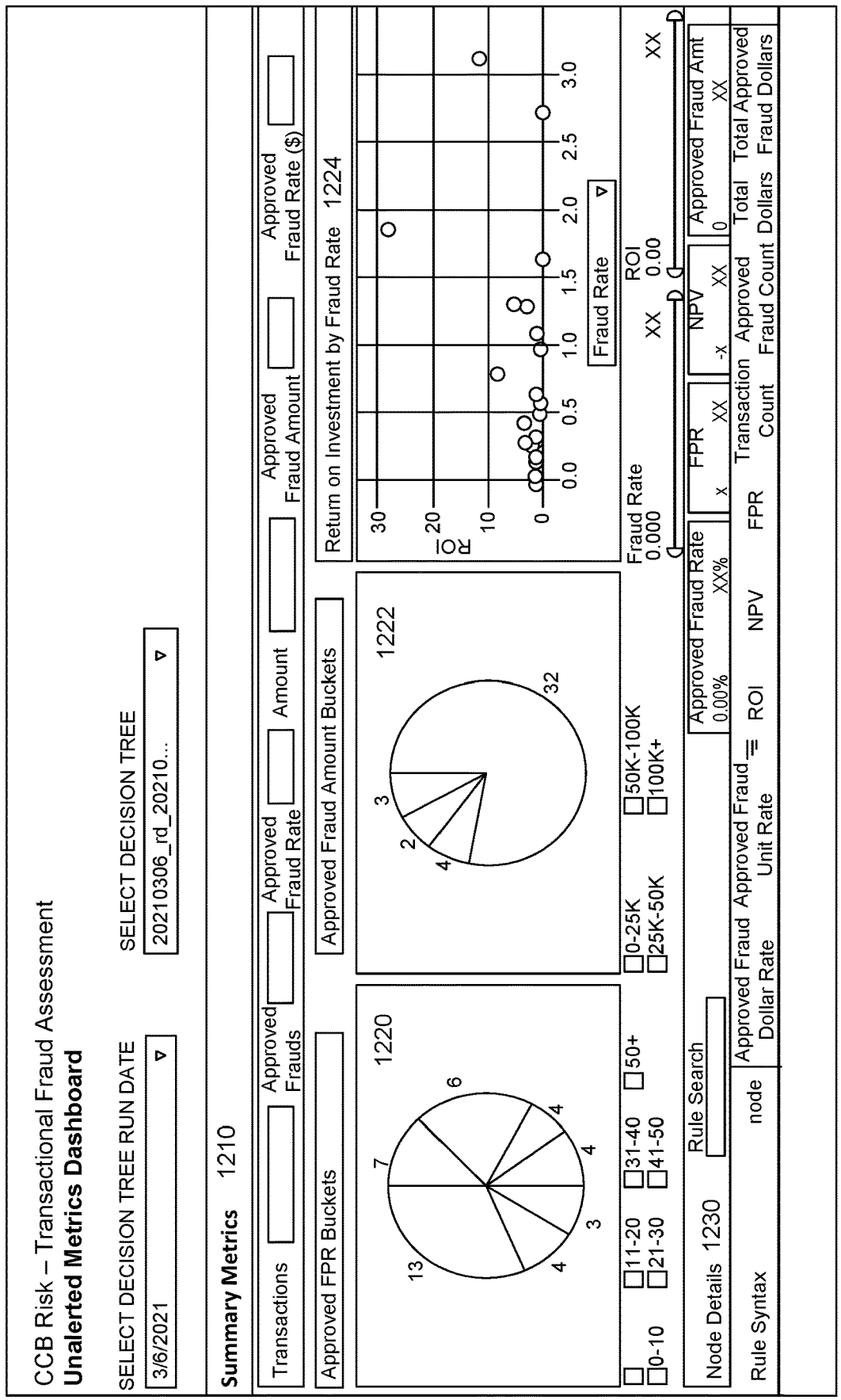
FIG. 12 illustrates an exemplary metrics dashboard, according to an embodiment of the present invention.

FIG. 12 illustrates an exemplary metrics dashboard, according to an embodiment of the present invention. FIG. 12 illustrates unalerted metrics dashboard. According to an embodiment of the present invention, "unalerted" may represent residual fraud which is not currently captured by existing controls such as Models or Fraud Strategies. Filters may be applied, such as Decision Tree Run Date and Decision Tree. Unalerted Metrics dashboard may include Summary Metrics 1210, including Transactions, Approved Frauds, Approved Fraud Rate, Amount, Approved Fraud Amount, Approved Fraud Rate ($), etc. Additional details may be provided via graphics including Approved FPR Buckets 1220, Approved Fraud Amount Buckets 1222, and Return on Investment by Fraud Rate 1224. Node Details may be provided at 1230 and include Rule Syntax, Node, Approved Fraud Dollar Rate, Approved Fraud Unit Rate, ROI, NPV, FPR, Transaction Count, Approved Total Fraud, Total Dollars, Total Approved Fraud Dollars, etc.

FIG. 13 illustrates an exemplary metrics dashboard, according to an embodiment of the present invention. FIG. 13 illustrates un-alerted features dashboard. FIG. 13 illustrates an unalerted features dashboard. Filters may be applied, such as Decision Tree Run Date and Decision Tree. Features Summary 1310 may include Feature Name, Feature Importance, and Rank. Features Trending may be graphically provided at 1320.

Figure 14:
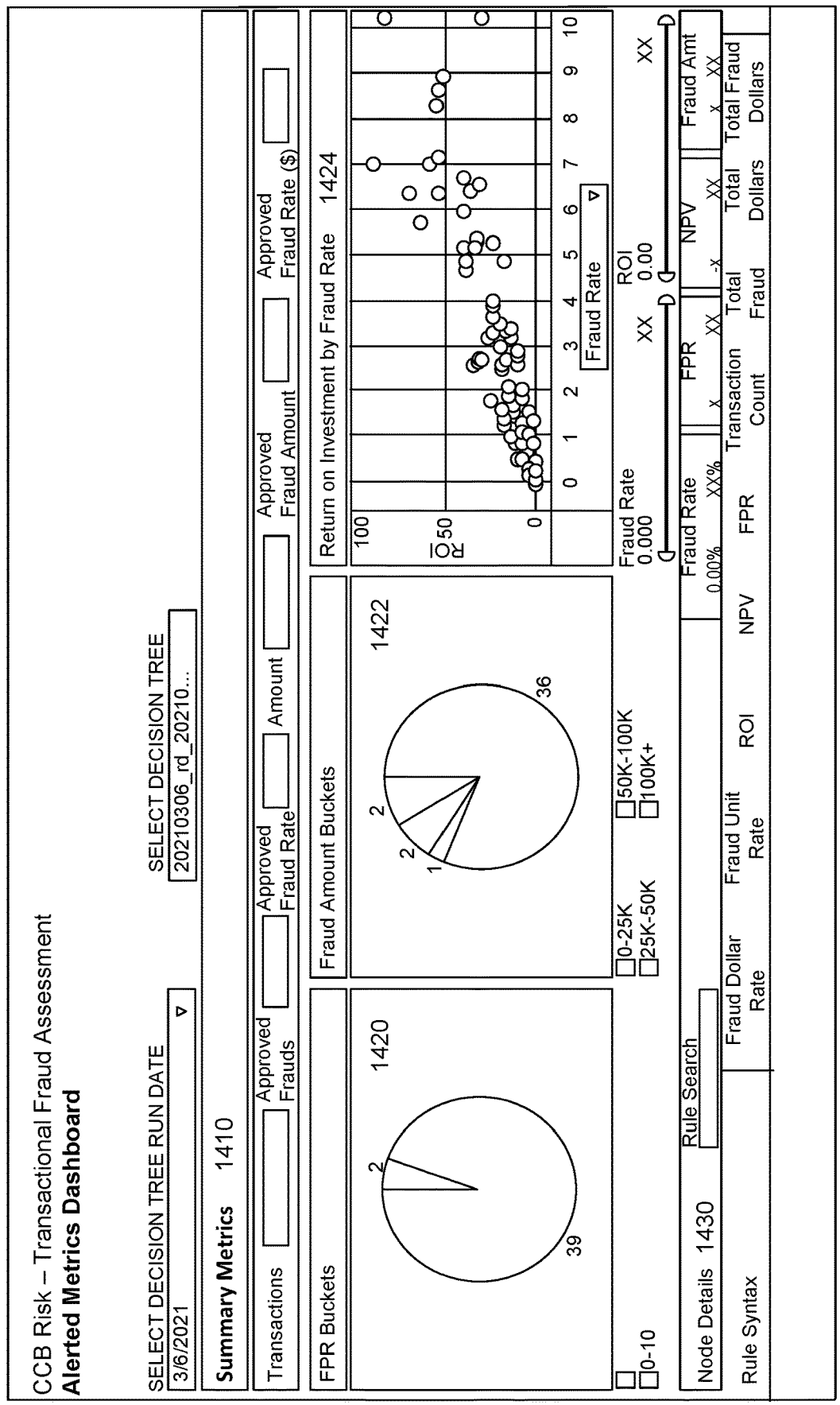
FIG. 14 illustrates an exemplary metrics dashboard, according to an embodiment of the present invention.

FIG. 14 illustrates an exemplary metrics dashboard, according to an embodiment of the present invention. FIG. 14 illustrates an alerted metrics dashboard. Filters may be applied, such as Decision Tree Run Date and Decision Tree. Alerted Metrics dashboard may include Summary Metrics 1410, including Transactions, Approved Frauds, Approved Fraud Rate, Amount, Approved Fraud Amount, Approved Fraud Rate ($), etc. Additional details may be provided via graphics including FPR Buckets 1420, Fraud Amount Buckets 1422, and Return on Investment by Fraud Rate 1424. Node Details may be provided at 1430 and include Rule Syntax, Fraud Dollar Rate, Fraud Unit Rate, ROI, NPV, FPR, Transaction Count, Total Fraud, Total Dollars, Total Fraud Dollars, etc.

FIG. 15 illustrates an exemplary metrics dashboard, according to an embodiment of the present invention. FIG. 15 illustrates an alerted features dashboard. FIG. 15 illustrates an alerted features dashboard. Filters may be applied, such as Decision Tree Run Date and Decision Tree. Features Summary 1510 may include Feature Name, Feature Importance, and Rank. Features Trending may be graphically provided at 1520.

FIG. 16 illustrates an exemplary metrics dashboard, according to an embodiment of the present invention. FIG. 16 illustrates un-alerted summary dashboard. Filters may be applied, such as Decision Tree Run Date and Decision Tree. Additional filters may include Total FPR, Approved Fraud Dollars and Approved Fraud Rate. Summary Metrics 1610 may include Approved FPR, Approved Fraud Count, Approved Fraud Dollars, Approved Fraud Rate, Approved NPV, Confirmed Fraud Count, Confirmed Fraud Dollars, Judged Fraud Count, Judged Fraud Dollars, Total Count, Total Dollars, Total FPR, Total Fraud Count, Total Fraud Dollars, Total Fraud Rate and Total NPV. Detailed Metrics 1620 may include Date, Rule Syntax with Approved FPR, Approved Fraud Count, Approved Fraud Dollars, Approved Fraud Rate, Approved NPV, Confirmed Fraud Count, Confirmed Fraud Dollars, Judged Fraud Count, Judged Fraud Dollars, Total Count, Total Dollars, Total FPR, Total Fraud Count, Total Fraud Dollars, Total Fraud Rate and Total NPV.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, PHP, C#, Go, Swift, Rust, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements autonomous fraud risk management for ATM transactions, wherein the system is configured to generate fraud rule recommendations to one or more users on a near real-time basis, the system comprises:

an interface of a computing device that receives input from the one or more users; and a fraud risk management server comprising a computer processor, electronically coupled to a memory component and the interface, the computer processor further programmed to perform the steps of:

loading initial data associated with a product from data stored in a cloud services platform, wherein the product comprises a financial transaction service offered at an ATM;

subsequently loading a plurality of other user-based events that occurred in connection with the product, wherein the subsequent loading generates a feature space for the plurality of events, wherein over a thousand features are generated for each of the plurality of events;

performing feature engineering on the generated feature space to generate a set of features, wherein feature engineering comprises feature exclusion, feature generation and feature transformation, wherein the feature generation and the feature transformation are performed after the feature exclusion, wherein the performing of the feature exclusion includes each of excluding one or more null columns, one or more universal exclusion variables, one or more cardinality columns, and one or more variables with volatility above a certain threshold from further processing for conserving computing resources when performing the feature generation and the feature transformation, and wherein the feature reduction on the generated feature space is performed via a random forest algorithm to reduce a number of features included in the generated feature space to a limited list of select features indicative of potential fraud;

initially training a machine learning model based on an initial training data set including the limited list of select features, the initial training data set including features of a potential fraudulent event;

monitoring the machine learning model in production to generate a new training data set comprising subsequent data and related events associated with the product;

retraining, on a daily basis, the trained machine learning model using the new training data set, the new training data set including features of another potential fraudulent event different from the potential fraudulent event;

developing fraud rule recommendations, on the daily basis, by applying the retrained machine learning model to the set of features to identify a decision tree model among a plurality of decision tree models having different tree depths and different number of nodes;

based on the decision tree model, identifying a set of top recommended rules that are new using performance evaluation of the fraud rule recommendations, wherein the performance evaluation relates to a false positive rate (FPR), return on investment (ROI), and a fraud rate;

displaying the results of the performance evaluation on the interface to allow a user to interact with a virtual analytics assistant to modify and customize the set of top recommended rules;

testing each of the set of top recommended rules in silent mode;

responsive to the testing, automatically approving or rejecting at least one rule of the set of top recommended rules;

when the at least one rule is automatically approved, upgrading the at least one rule to production;

performing rule performance evaluation and monitoring;

automatically decommissioning the at least one rule in product when the monitoring detects a failure to meet minimum performance standards and pruning the decision tree model in response to the decommissioning;

displaying on the interface, for user visualization, the pruned decision tree model;

detecting and tracking a number of ATM transactions in different ATMs at different locations;

determining whether the number of ATM transactions conducted using the different ATMs at the different locations reached a peak during a reference period of time, wherein the peak comprises a spike in the number of transactions or dollar amounts during a short window of time; and when the number of ATM transactions using the different ATMs at the different locations is determined to have reached the peak, determining, by applying the pruned decision tree, whether the detected peak corresponds to a fraud event.

2. The system of claim 1, wherein the machine learning model comprise an array of decision trees based on short and long term trends, complexity and granularity.

3. The system of claim 1, wherein the feature generation identifies one or more non-monetary features.

4. The system of claim 1, wherein the feature transformation applies one or more of:
bin require continuous variables and one-hot encoding.

5. The system of claim 1, wherein the decision tree model represents a set of if-else statements.

6. The system of claim 1, wherein the decision tree model is applied to rank importance of the set of features.

7. The system of claim 1, the virtual analytics assistant enables custom rule development by applying one or more variables and accessing performance data.

8. The system of claim 1, the virtual analytics assistant provides ad hoc analysis comprising a summary of current fraud, an ability to check metadata for data availability and an ability to explore individual features and their distribution with respect to fraud.

9. The system of claim 1, wherein generation of the set of features includes, acquiring an initial data for a product, acquiring related events that occurred in connection with the product, and feeding the acquired initial data for the product and the related events to a random forest algorithm to reduce a number of features to be generated in the set of features.

10. The system of claim 1, wherein the input is provided as text data, the text data is converted into a dot file, and the dot file is subsequently converted into a decision tree image for visualization.

11. A method that implements autonomous fraud risk management for ATM transactions, wherein the method is set to generate fraud rule recommendations to one or more users on a near real-time basis, the method comprising the steps of:

loading initial data associated with a product from data stored in a cloud services platform, wherein the product comprises a financial transaction service offered at an ATM;

subsequently loading a plurality of other user-based events that occurred in connection with the product, wherein the subsequent loading generates a feature space for the plurality of events, wherein over a thousand features are generated for each of the plurality of events;

performing, via a fraud risk management server, feature engineering on the generated feature space to generate a set of features,
wherein feature engineering comprises feature exclusion, feature generation and feature transformation,
wherein the feature generation and the feature transformation are performed after the feature exclusion,
wherein the performing of the feature exclusion includes each of excluding one or more null columns, one or more universal exclusion variables, one or more cardinality columns, and one or more variables with volatility above a certain threshold from further processing for conserving computing resources when performing the feature generation and the feature transformation, and
wherein the feature reduction on the generated feature space is performed via a random forest algorithm to reduce a number of features included in the generated feature space to a limited list of select features indicative of potential fraud;

initially training a machine learning model based on an initial training data set including the limited list of select features, the initial training data set including features of a potential fraudulent event;

monitoring the machine learning model in production to generate a new training data set comprising subsequent data and related events associated with the product;

retraining, on a daily basis, the trained machine learning model using the new training data set, the new training data set including features of another potential fraudulent event different from the potential fraudulent event;

developing, via the fraud risk management server and on the daily basis, fraud rule recommendations by applying the retrained machine learning model to the set of features to identify a decision tree model among a plurality of decision tree models having different tree depths and different number of nodes;

based on the decision tree model, identifying a set of top recommended rules that are new using performance evaluation of the fraud rule recommendations, wherein the performance evaluation relates to a false positive rate (FPR), return on investment (ROI), and a fraud rate;

displaying the results of the performance evaluation on an interface of a computing device to allow a user to interact with a virtual analytics assistant to modify and customize the set of top recommended rules;

testing each of the set of top recommended rules in silent mode;

responsive to the testing, automatically approving or rejecting at least one rule of the set of top recommended rules;

when the at least one rule is automatically approved, upgrading the at least one rule to production;

performing rule performance evaluation and monitoring;

automatically decommissioning the at least one rule in product when the monitoring detects a failure to meet minimum performance standards and pruning the decision tree model in response to the decommissioning;

displaying on the interface, for user visualization, the pruned decision tree model;

detecting and tracking a number of ATM transactions in different ATMs at different locations;

determining whether the number of ATM transactions conducted using the different ATMs at the different locations reached a peak during a reference period of time, wherein the peak comprises a spike in the number of transactions or dollar amounts during a short window of time; and when the number of ATM transactions using the different ATMs at the different locations is determined to have reached the peak, determining, by applying the pruned decision tree, whether the detected peak corresponds to a fraud event.

12. The method of claim 11, wherein the retrained machine learning model comprise an array of decision trees based on short and long term trends, complexity and granularity.

13. The method of claim 11, wherein the feature generation identifies one or more non-monetary features.

14. The method of claim 11, wherein the feature transformation applies one or more of: bin require continuous variables and one-hot encoding.

15. The method of claim 11, wherein the decision tree model represents a set of if-else statements.

16. The method of claim 11, wherein the decision tree model is applied to rank importance of the set of features.

17. The method of claim 11, the virtual analytics assistant enables custom rule development by applying one or more variables and accessing performance data.

18. The method of claim 11, the virtual analytics assistant provides ad hoc analysis comprising a summary of current fraud, an ability to check metadata for data availability and an ability to explore individual features and their distribution with respect to fraud.

* * * * *